Patented May 27, 1947

2,421,117

UNITED STATES PATENT OFFICE 2,421,117

PROCESS FOR PRODUCING PLANT EXTRACTS

Ole Gisvold, Minneapolis, Minn., assignor to Regents of the University of Minnesota, Minneapolis, Minn., a corporation of Minnesota No Drawing. Application March 6, 1943, Serial No. 478,321

13 Claims. (Cl. 260—619)

This invention relates to methods and apparatus for the preparation of relatively pure extracts of plants of the species Larrea divaricata (sometimes also known as Larrea tridentata or Covellia tridentata), suitable for use for pharmaceutical and food preservative purposes.

It has been discovered that plants of the species Larrea divaricata contain nordihydroguairetic acid, a compound of phenolic nature, having the empirical formula $C_{18}H_{22}O_4$ and the structure:

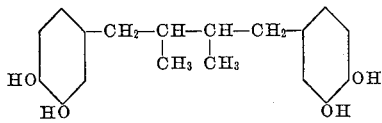

According to the Geneva nomenclature, nordihydroguaiaretic acid may be designated beta, gamma-dimethyl, alpha delta-bis (3,4-dihydroxyphenyl) butane. The melting point of this material is 183°–184° C.

In addition to nordihydroguaiaretic acid, plant material of the species Larrea divaricata also appears to contain other phenolic constituents, rubber-like substances, pigments, cellulose and various other complexes, which are undesirable contaminants insofar as concerns many uses of the nordihydroguaiaretic acid component, although some of such other constituents are in themselves useful.

It is an object of the invention to provide a convenient, efficient method of separating the constituents of natural plant material of the species Larrea divaricata, and a particular object to provide methods of making extracts having a high concentration of nordihydroguaiaretic acid. Other objects of the invention include the provision of methods of making clean separations and efficient purification of Larrea divaricata constituents, to obtain nearly pure nordihydroguaiaretic acid, and other plant extract fractions.

In carrying out the invention, there is first prepared a primary relatively impure, extract of the plant material. For this purpose, the plant material consisting of small twigs, leaves, stems, flowering tops, some seed, or the whole plant, if desired, is dried either by air drying or artificial drying. Foreign material such as adherent dirt and the like is removed and the plant material is then preferably, though not necessarily, ground in any suitable mill, such as a hammer mill, a Jacobson mill, or the like, until a fine powder results. Grinding can be accomplished without difficulty, and the powder is fairly dense. The size of grinding is preferably 10 to 100 mesh, 20 to 80 mesh being suitable for most efficient extraction. The powder is yellowish-green in color and has an odor which is not unpleasant when dilute but is somewhat disagreeable when concentrated. The powdered material may be stored in tightly closed tins for a period of weeks without appreciable deterioration. The whole plant may, if desired, be extracted but for the most efficient and thorough utilization of the raw material it should be ground to a powder.

The plant material is then extracted preferably by percolation or continuous extraction with a solvent capable of extracting the resinous constituent of the plant material. The suitability of any prospective solvent may be gauged by testing an extract solution made with the solvent in question for the color reactions characteristic of catechol using a ferric chloride test solution (known in the pharmacopeoia as ferric chloride T. S.) in the presence of an aqueous solution of sodium carbonate test solution. Thus to determine the suitability of a prospective solvent, one may make a test extraction and then to the solvent extract add a small quantity of ferric chloride T. S. in accordance with the usual technique for testing for the color reactions characteristic of catechol. Where the desired plant fractions are present, they are revealed even in very dilute strengths. Thus, a small drop of plant extract may be diluted to 15 to 20 cc. with methyl alcohol and this is used for the color tests.

It may be explained that the characteristic green-blue-violet color changes characteristic of catechol may not be very distinct when ferric chloride T. S. alone is used, and so as to bring out the color reactions (and thus make the test more certain) there is added a dilute, preferably freshly prepared, solution of sodium carbonate. This is added drop by drop to the color test solution after ferric chloride T. S. is added. Where the plant extract solvent in question is suitable for the extraction, the much diluted sample of extract solution will be fairly clear and only slightly tinged, a faint olive, upon addition of ferric chloride T. S. Upon addition of sodium carbonate, drop by drop, the color changes to an emerald green (a critical color phase, easily passed). As more sodium carbonate is added, the color changes through to a deep blue-green to blue, blue-violet and finally deep violet-red (wine) color. Where the prospective plant extraction solvent is not suitable, these characteristic reactions do not occur.

The solvent may thus be characterized as one capable of yielding an extract of Larrea divaricata giving the color reactions characteristic of catechol using ferric chloride T. S. (10% aqueous ferric chloride solution) in the presence of sodium carbonate (1% freshly prepared aqueous sodium carbonate solution).

Exemplary suitable solvents are in general organic solvents containing a halogen, oxygen or nitrogen in the molecular structure or mixtures of these solvents. Thus oxygen containing organic solvents such as the alkyl ethers, notably ethyl ether, isopropyl ether, butyl ether, and the like, cyclic ethers such as dioxane or a ketone such as acetone, may be used. Other oxygen containing organic solvents are the alcohols, such as methyl, ethyl propyl, amyl, isopropyl and isoamyl alcohols or the glycols, such as propylene glycol; alkyl esters, such as ethyl acetate, or other low boiling acetates; acids such as glacial acetic acid, all are suitable. Likewise the halogen containing organic solvents such as chloroform, dichloromethane, methylene dichloride, ethylene dichloride and ethylene dibromide may be used. Similarly the nitrogen containing organic solvents such as pyridine and "Morpholine" may be used. Ethyl ether is preferred where suitable equipment is available.

Some of the foregoing solvents are more efficacious than others and widely different extraction periods are therefore necessary. Thus when using di-ethyl ether, the extraction is as complete as necessary for practical purposes in 1½ hours to 4 hours, whereas some of the halogenated solvents, chloroform, ethylene dichloride and the like, requiring from 8 hours a day or more for extraction.

The extract is then filtered to remove the extraneous material and the solvent is partially or completely removed by evaporation or distillation. The solvent removal step, the temperatures of distillation or evaporation, and other details depend upon the characteristics of the particular solvent used and are obvious once the solvent has been selected as hereinbefore taught. Thus where ethyl ether is used, simple distillation or evaporation is sufficient for its removal. For economy, the solvent should be recovered.

After removal of all or nearly all of the solvent there remains a dark, yellowish-brown, tarry mass which is designated herein as the "crude" or "primary" extract. This extract contains substantial amounts of nordihydroguaiaretic acid (probably 25–35%), and some fats, waxes, rubber-like materials, pigments, some of which are flavone-like materials, and other fractions. It may be pointed out at this juncture that there is no accurate method available for the quantitative determination of nordihydroguaiaretic acid, and the content is therefore judged from the amount of crystalline nordihydroguaiaretic acid recovered, as hereinafter described from a given quantity of the primary extract.

The primary extract is then redissolved in a water-immiscible solvent, preferably one which readily dissolves the extract in all proportions. For this purpose, there is used a water-immiscible solvent such as the ethers. Diethyl ether is very satisfactory. The solution at this point is prepared by utilizing hot solvent and a sufficient amount of primary extract is dissolved so as to bring the concentration to 10–70%. Thus, for example, two liters of diethyl ether may be used for dissolving 1.2 to 1.6 pounds of the crude primary extract. The solution is then filtered to remove extraneous solids and is allowed to cool, whereupon a precipitate forms and is separated out. This precipitate is probably rubber-like complexes of the Larrea divaricata plant material, which are extracted along with the desired nordihydroguaiaretic acid fractions by the primary extraction solvent.

Subsequent purification includes reaction of the crude primary extract with, optionally, a neutral or mildly alkaline material, and then reaction with alkaline reagents of successively stronger degree. During this procedure, the desired fractions of the extract are protected against oxidation by the presence of a reducing agent where the washing reagent is distinctly alkaline (an alkalinity of the order of sodium carbonate or more alkaline substances), though such protection is unnecessary where the washing reagent is neutral or mildly alkaline (an alkalinity of the order of sodium bicarbonate).

In carrying out this phase of the purification treatment, there is preferably (though not necessarily) included a plurality of washings with aqueous sodium potassium or other mild bicarbonate solution of, for example, 2 to 10% strength. This washing permits the reaction of certain fractions of the plant extract with the very mildly alkaline carbonates, with the result that they are converted to salts and are rendered water soluble.

The amount of aqueous carbonate solution which is added to the water-immiscible solvent solution of the primary plant extract may be widely varied. Thus, for example, when using 2 liters of diethyl ether containing (originally) 1.3 pounds of crude extract, there may be used a total 300 to 500 cc. 3 to 10% aqueous alkali bicarbonate solution in one or more portions. A desirable procedure is to wash (and thus react) the dissolved plant material with successive portions of the mild alkaline bicarbonate. Thus, a portion of the bicarbonate solution may be shaken thoroughly with the non-aqueous solvent solution of the crude plant extract. The aqueous portion is allowed to settle, and it is separated. The separated aqueous portion is then acidulated (acid to litmus) with, for example, hydrochloric acid or sulfuric acid, and a precipitate of one fraction of the plant material settles out.

Additional, preferably equal, portions of bicarbonate solution may be successively added to the water-immiscible solution of plant extract, and each shaken, separated and acidulated. When no more precipitate forms upon acidulation of the separated alkali bicarbonate washing solution, this indicates that the reaction of fractions of the plant extract with the alkali bicarbonate solution has been completed and this phase of the purification is terminated. The separated precipitated plant material may be collected and used as desired. It is not, however, the fraction containing appreciable amounts of nordihydroguaiaretic acid.

At this juncture, it may be noted that it is unnecessary to protect the desired fractions of the plant extract from oxidation during the reaction of the crude (or primary) plant extract with the mild alkali bicarbonate because of the mild alkaline reaction of bicarbonate. However, such protection is desirable during subsequent reactions with more alkaline reagents.

Where strict purity of the plant material is not justified by cost or other considerations, one may dispense with the reaction with the mild alkali bicarbonate and the purification effected thereby.

The solution of primary extract in a non-aqueous water immiscible solvent (which may optionally have been washed with sodium bicarbonate solution as indicated above) is reacted with a somewhat more alkali carbonate, such as for example, sodium, potassium or equivalent carbonates. This reaction may be carried out in one step, but preferably by successively reacting the dissolved crude extract with small portions of the alkali (preferably sodium) carbonate which may be either in solid phase or liquid phase.

In the preferred method, there is prepared an aqueous solution of sodium carbonate (3-8%) containing also a reducing agent, preferly sodium hydrosulfite (1 to 4%) for preventing oxidation of the plant extract, and the aqueous solution is reacted in successive small portions with the crude or partially purified (primary) plant extract while the latter is dissolved in a water-immiscible solvent. The size and number of successive portions may be varied. For example, 2 liters of water-immiscible solvent containing 20-30% by weight of primary plant extract may be washed successively with 40 to 80 cc. portions of 3 to 8% of the aqueous alkali (preferably sodium) carbonate solution containing 1-2% sodium hydrosulfite or other reducing agent capable of inhibiting oxidation of the nordihydroguaiaretic acid fractions. Each portion of aqueous alkali carbonate reducing agent solution is thoroughly shaken with the water-immiscible solvent solution of the primary plant extract and a reaction takes place with certain of the plant extract factors. This is probably a salt formation, which allows the salt of the particular fraction to dissolve in the aqueous layer. The aqueous layer is then allowed to settle and is separated. The aqueous layer is then acidulated with hydrochloric or sulfuric acid and the dissolved plant extract fractions are precipitated. The fractions so separated do not contain appreciable amounts of nordihydroguaiaretic acid, but may be collected and used for other purposes, for example in pharmaceuticals.

Additional, preferably equal portions of alkali carbonate-reducing agent solutions, are successively added to the water-immiscible solution of plant extract and each addition is shaken, separated and acidulated. This is done until no further precipitate forms upon acidulation (acid to litmus paper).

It may be pointed out at this juncture that the acidulation indicates completion of this stage of the reaction, for when no precipitate forms in the washing solution that has been shaken, settled and separated, one may be certain that the solution has removed as much of the plant extract fraction in question, as is capable of being removed by the alkali carbonate-reducing agent solution. The acidulation test in each washing procedure may be dispensed with, where, due to previously acquired experience, the operator is reasonably certain of the completion of the various washing steps and the plant extract fraction is not desired to be reclaimed.

The water-immiscible solution of thus partially purified primary plant extract is then subjected to a series of extraction reactions with an aqueous solution of strong alkali containing a strong reducing agent for the protection of the plant extract factors that are separated at this stage. In carrying out this series of separation extractions, the water-immiscible solvent solution of primary extract, which (optionally) has been partially purified by the nearly neutral or mildly alkaline (e. g., alkali bi-carbonate) washings and partially purified by the fairly alkaline ( e. g., alkali carbonate) washings, is extracted a small or large number of times with an aqueous solution of strong alkali hydroxide such as sodium or potassium hydroxide (3 to 8%) containing a considerable amount of strong reducing agent such as sodium hydrosulfite (2 to 4%).

The total volume of aqueous solution of strong alkali hydroxide and strong reducing agent may be varied widely, and may be used in a few portions of relatively large size or any number of small portions as hereinafter explained. The reaction by which extractions of the plant fractions are selectively accomplished, appears to be due to the selective salt formation of the fractions with the hydroxide used, one fraction being nearly completely reacted before the next fraction is reacted appreciably. By using appropriately sized portions of aqueous hydroxide solutions and then removing the aqueous layer (which, after reaction, contains the salt of the reaction product) it is possible to fractionate the plant material.

In order to determine the amount of hydroxide necessary for reaction for each plant fraction, it is best initially to carry out the reaction in 20 to 30 small batches, each aqueous hydroxide portion being added, reacted and removed. Then by later judging the resulting plant extract produced by each successive portion, it is possible to determine the total amounts of hydroxide necessary to reaction with each particular fraction.

Thus, where working with two liters of the water-immiscible solvent containing (originally) 20% to 30% of primary plant extract, the aqueous hydroxide-reducing agent solution may conveniently be 15 to 50 cc. After the first portion of aqueous sodium hydroxide-sodium hydrosulfite solution has been added to the water immiscible solvent solution of (semi-purified) plant extract, the mixture is thoroughly shaken for several minutes, then allowed to settle, and the aqueous layer separated. The aqueous layer contains one type of plant extract factor and to release it, the aqueous solution is acidulated with hydrochloric or sulfuric acid until the solution is acid to litmus. The aqueous solution is set aside and the dissolved plant extract factor later settles out.

This procedure of separation extraction is repeated 20 to 35 times and each aqueous portion which contains some plant factor, is set aside. The portions are preferably numbered sequentially for record purposes. All extractions are allowed to stand at room temperature (16-18° C.), and after a number of hours in each aqueous extraction solution there appears a solid residue which settles out. The residue of the first 8 to 12 extractions is a yellow-brown, water insoluble, viscous material. At one or two successive intermediate extractive portions in the series, the settled residue appears as a distinctly crumbly yellow-brown cake. Thence, through the successive extractions beyond those having the characteristic of a crumbly cake, the residue is a distinctly crystalline material which may agglomerate into masses that are easily dried and broken. When dry (and before the lumps are broken) the masses are yellow with a tinge of brown, not quite as yellow nor so hard as lump sulfur. The agglomerates are easily powdered with moderate pressure, and upon powdering the yellow color is much less accentuated; the brownish tinge almost disappears.

If a sufficient number of extractions are made (sometimes 30 to 35) the yield of distinctly crystalline material is maintained fairly constant up to one of the extractions, and then rather sharply decreases, indicating that all of the plant material that is soluble in the alkali hydroxide has been separated out. The last or last several extractions may contain a greenish pigment and for the sake of purity, these are separately collected.

Where the primary plant extract is made with solvents such as ether, the greenish pigment is concentrated in the last or last few extractions whereas with other solvents, notably dichlor-ethylene, the greenish pigment is distributed throughout many of the extractions. It may be stated parenthetically that the initial preparation of the primary plant extract with ether is therefore desirable from the standpoint of sharp separation of the greenish pigment in the last purification extractions, and ether is also desirable from the standpoint of rapidity with which the initial extraction of the raw plant material may be made. However, because of fire hazards which accompany the use of ether, it is, in many instances, advisable to forego these advantages and use a non-volatile extraction solvent, such as dichlor-ethylene for initially extracting the plant. Thereafter, the primary extract can be re-dissolved in a small easily handled and protected volume of ether (e. g., diethyl ether) and the washings and extractions made therefrom, as hereinbefore described.

In order to enable the operator to discern the change point or "break" in the series of aqueous extractions, separating those yielding viscous material and those yielding the distinctly crystalline nordihydroguaiaretic acid, the operator may, while making the extractions, test each one for the color reactions of catechol, using the procedure hereinbefore outlined. The first extractions which ultimately yield the viscous material will not show the characteristic catechol color reactions. The one or two extractions which yield the crumbly cake begin to show the characteristic color reactions and the latter extractions which ultimately yield 85–90% purely nordihydroguaiaretic acid as a distinctly crystalline material show the color reactions very markedly. The break in the series is quite marked, and the operator can thus tell, after acidulation and standing, the type of material to be obtained from each extraction. The color reactions thus afford a convenient and sensitive control.

The series of final purification extractions with hydroxide-reducing agent solution serves as a means of separating useful components of the plant material. The water insoluble, yellow-brown viscous material of the first extractions may, if desired, be gathered together as one plant extract fraction. As this material is phenolic in nature and exhibits some germicidal and antioxidant properties, it is useful for many purposes. Thus a commercial grade of lard, having a normal life of 5 hours when tested according to the Swift rapid rancidity test, will resist development of oxidative rancidity for about 20 hours when 0.01% of this fraction is added thereto. It may be pointed out that a "5 hour" commercial lard, i. e., one capable of resisting development of oxidative rancidity for 5 hours when tested according to the Swift rapid rancidity method, is not at all unusual, although other grades of lard produced under ideal conditions may, in their natural state have a life of 20–30 hours. Thus by using 0.01% of this fraction an average commercial grade of lard may be given a shelf life nearly equal to the very best commercial grades.

The crumbly-caked material of the intermediate extractions is the line of demarcation in the series and such material may be collected separately or reworked in subsequent batches. The properties of this material partake of the characteristics of both the viscous material of the earlier extractions and the distinctly crystalline material of the subsequent extractions. The distinctly crystalline material of the latter extractions is 85–90% pure nordihydroguaiaretic acid, (beta, gamma-dimethyl, alpha delta-bis (3,4 dihydroxyphenyl) butane).

When the distinctly crystalline material is added to lard in a concentration of 1/100%, the lard resists development of oxidative rancidity for 136 hours when tested in accordance with the Swift rapid rancidity test described in "Oils and Soap," vol. 10, pages 105–109 (1933). A control sample tested under like conditions develops oxidative rancidity in 23 hours. The distinctly crystalline material is also an effective germicide for it inhibits growth of staphylococcus aureus in concentrations of 5 parts/million and kills staphylococcus aureus in concentrations of 25 parts/million.

The invention is further illustrated by the following specific examples which should not, however, be interpreted as limitations upon the invention.

Example 1

Dried plant material of the species Larrea divaricata was pulverized to 20 mesh in a Jacobsen mill and 5½ pounds of the pulverized material was extracted with about 6 liters of di-ethyl ether in a Soxhlet-type extractor. The extraction was complete in about 2 hours and the hot extract solution was filtered. The ether was evaporated off at atmospheric pressure and recovered. The evaporation of the ether was continued until the volume of crude plant extract had been reduced to about 2 liters. The concentrated crude extract was then allowed to cool, whereupon a precipitate of rubber-like complexes formed. This was filtered off.

The batch of 2 liters of crude (or primary) plant extract was then washed with successive 60 cc. portions of aqueous 5% sodium bicarbonate solution. Each 60 cc. portion of 5% aqueous solution bicarbonate solution was added to the 2 liters di-methyl ether solvent of primary plant extract; the mixture was shaken thoroughly for 2 to 3 minutes and allowed to settle. The sodium bicarbonate aqueous layer was then separated and acidulated with hydrochloric acid until it was acid to litmus paper, whereupon a precipitate formed indicating that a fraction of the plant extract had been removed by way of the aqueous layer.

The washing was repeated with successive 60 cc. portions of 5% aqueous sodium bicarbonate solution until upon separation and acidulation, no further precipitate of plant extract material occurred in the aqueous sodium bicarbonate solution. This was achieved after about 500 cc. total of washing solutions of 5% sodium bicarbonate had been used in successive washings.

The 2-liter batch of the thus somewhat purified plant extract was then again subjected to another series of washings, using in this instance a 5% aqueous sodium carbonate solution containing 1½% sodium hydrosulfite reducing agent. In each instance, the portion of washing solution was 50–60 cc., the washing was continued for 2–3 minutes by shaking, the solution was separated and then acidulated (acid to litmus paper). In the first aqueous 5% sodium hydroxide-1½% sodium hydrosulfite washing portions so treated, a precipitate occurred, but after about 500 cc. of washing solution had been used in successive portions, no further precipitate was formed, indicating the reaction with carbonate, was completed. The lack of formation of precipitate indicates completion of this washing procedure.

The 2-liter batch of thus purified plant extract was then subjected to a succession of substantially identical extractions utilizing as the extraction medium a 5% aqueous sodium hydroxide solution containing 2½% sodium hydrosulfite reducing agent. The extraction technique is similar to the washing technique used for purification of plant extract except that the desired plant extracts are soluble in and are recoverable from the aqueous 5% sodium hydroxide-2½% sodium hydrosulfite extraction solution.

In carrying out this step, the 2-liter batch was first shaken with a 30 cc. portion of aqueous 5% sodium hydroxide solution containing 2½% sodium hydrosulfite. The shaking was continued for 2–3 minutes and after settling, the aqueous layer was removed and acidulated. This portion was numbered and set aside. The 2-liter batch was then extracted with 30 successive 30 cc. portions of the same strength sodium hydroxide-sodium hydrosulfite aqueous solution, each being separated, acidulated and sequentially numbered.

During the series of extractions, each was tested for the color reactions of catechol hereinbefore referred to. Extractions 1 to 12 gave the color test characteristic of the orange flavone (obtained from the sodium carbonate extractions) being a slight olive color when ferric chloride test solution was added. Then as the sodium bicarbonate test solution was added drop by drop, the olive color intensified almost to opaqueness (being deep olive color when held to a bright spot of daylight light). Upon further addition of the sodium carbonate test solution, the color darkened to red-brown. These fractions do not contain appreciable amounts of nordihydroguaiaretic acid.

Extractions 13 to 30 were likewise tested in a similar manner. When ferric chloride test solution was added a very faint yellow-olive color appeared, being hardly discernible in a test tube held against daylight light. Then as the sodium carbonate test solution was added very carefully by small drops, the color changed to emerald-green (a critical color phase, easily passed) then to blue-green, to blue, then blue-violet, to violet and finally to a deep violet-red (wine) color. These fractions contain nordihydroguaiaretic acid as a major constituent.

It was thus apparent, even during the process of making the extractions, that a different plant extract fraction was separated in extractions 1–12 than in extractions 13–30. Extraction 12 gave evidence of color reactions characteristic of each phase. The difference in product become further apparent after the extractions had been allowed to stand undisturbed at room temperature (16–18° C.) overnight (about 8 hours).

In each portion of aqueous extraction solution, there had settled a solid layer of residue but the character of the residue layer varied throughout the extractions. Throughout extractions Nos. 1–11 the solid residue was a thin layer of water insoluble, viscous, fairly dark yellow-brown material. It exhibited some antioxidant and germicidal properties.

The solid residue of extraction #12 was a layer of crumbly material neither wholly crystalline nor wholly viscous. Extraction #12 apparently represents the dividing line or "break" in the extraction series.

The solid residue in each of extractions Nos. 13 to 36 was a crystalline material. In extractions 13 to 28 the crystalline was yellow-brown when dry whereas in No. 29 and 30 the crystals had a greenish tinge. In all 13 to 30 the layer was easily crumbled, contained about 88% of nordihydroguaiaretic acid. The crystalline material melted at 183–184° C. and prevented the development of oxidative rancidity for a period of 136 hours when present in a concentration of 1/100% in lard and tested according to the Swift rapid rancidity test procedure, supra. The crystalline material likewise exhibited exceptional germicidal value being effective in concentrations of 5 parts/million to inhibit growth of staphylococcus aureus and effective in concentration of 25 parts/million to kill staphylococcus aureus.

In carrying out the purification the number of washings and purifications may be reduced or dispensed with entirely. Thus, the washing with alkali, bicarbonate, e. g., sodium bicarbonate, may be eliminated. The resultant final product is somewhat less pure but is useful for many purposes. In carrying out the washing with alkali carbonate, e. g., sodium bicarbonate, in the presence of a reducing agent the size and number of the washing solution portions may be changed, for example, from nine or ten 50 to 60 cc. portions in Example I, to two or three portions of 150 to 200 cc. size or one portion of 500 to 600 cc. size. Similarly, the number of extractions with alkali hydroxide, e. g., sodium hydroxide, in the presence of a reducing agent may be varied considerably. Thus, in this example the 30 extractions with 30 cc. portions of 5% sodium hydroxide-2½% sodium hydrosulfite may be varied so as to attempt to react out all or almost all of one plant fraction before reacting out the other.

A useful schedule for accomplishing the final fractionation comprises three extractions of 90 cc., four extractions of 30 cc., four extractions of 120 cc. followed by four extractions of 30 cc. From the schedule of 30 extractions of 30 cc. each in Example I, it is apparent that the critical division points or "breaks" between the successive fractions are in the neighborhood of the 11th to 12th and 28th to 29th portions. The amount of extraction solution represented by the first 10 to 11 portions may be utilized in several large portions, or in one portion, then as the critical point is approached, it is best, in the interest of clean separation, to utilize small extractive proportions so as to allow a clean division in extracted material. Then for the amount of solution represented by say the 13th to the 27th or 28th extraction there may likewise be used large portions, until the point is reached where the final green-tinged precipitate is known to appear. Then by using small final portions a sharp cut may be made between the final crystalline material that is green-tinged and the more pure material.

Where sharpness in separation is not necessary, or cannot be justified from the standpoint of expense, a reasonably good separation may be achieved by only two extractions, the amount of each being judged as approximately correct for reaching the division point between the viscous and crystalline material. To accomplish this result in Example I, one portion of about 360 cc. of hydroxide may be followed by another portion of 570 cc.

The mechanism of this phase of the purification is not clearly understood, but it is believed to be as follows: The viscous material is apparently a phenolic compound more "acidic" in character than nordihydroguaiaretic acid. Thus with reference to Example I, when the 5% sodium hydroxide solution is present the viscous apparently more acidic (phenolic) material reacts with the hydroxide forming probably a sodium salt, and apparently to the substantial exclusion of a sodium salt forming reaction of nordihydroguaiaretic with sodium hydroxide. This sodium salt is soluble in water and is dissolved in the aqueous extracting solution. When all of the viscous apparently more acidic (phenolic) material has been exhausted by salt formation and removal, the nordihydroguaiaretic acid is then free to react and also form a sodium salt, which is also soluble. This likewise is removed. The greenish pigment (which is least reactive) is removed last, at least this occurs where the original plant extract is made with ether. By making a test run with a large number (20 to 30) small portions of sodium hydroxide extracting solution, the approximate amount of hydroxide necessary to exhaust first the viscous (phenolic) material and then the nordihydroguaiaretic acid components can be gauged for any grade of starting material.

As the amounts of the various plant fractions vary to some extent in specimens of *Larrea divaricata* grown under varying conditions, it is advisable to make a test run using a large number of small extractions so as to determine the "breaks" in the extraction series. The schedule adopted depends, of course, upon cost and plant facilities available for manufacturing operations.

Example II

One hundred pounds (100#) of plant material was ground to about 30 mesh in a hammer mill and extracted with about one drum (55 gallons) of ethylene dichloride using an industrial size Soxhlet-type continuous extractor. The extraction temperature varied from 50° to 60° C. and extraction was continued for twelve hours. The extract was then filtered and concentrated by evaporation until the volume was about two gallons. The concentrated extract was allowed to cool, whereupon a rubber-like precipitate formed and was removed by filtration.

A two quart (2 qt.) portion of the concentrated liquor was then thoroughly mixed with one pint of water containing ¾ lb. of sodium bicarbonate and ⅓ lb. of sodium hydrosulfite, and the mixture was then evaporated to dryness. The dry residue was powdered and extracted with about 3½ gallons of di-ethyl ether, and the ether extract was filtered for further purification and fractionating. It may be noted in passing that in this method the salt formed by reaction with sodium bicarbonate was left in the dry mass, and the remaining plant extracts were removed by the ether extraction whereas when washing with a mixture of aqueous and non-aqueous solvents as in Example I, the salt was removed by the aqueous layer.

About two quarts of the di-ethyl ether solution of plant extract was then mixed with one pint of water containing 5% sodium carbonate and 1½% sodium hydrosulfite and thoroughly shaken for several minutes. The water layer was then allowed to form and was separated and discarded.

The remaining di-ethyl ether solution which was still nearly two quarts in volume was then successively extracted with one pint portions of an aqueous solution of sodium hydroxide (5%) and sodium hydrosulfite (2½%). Fifteen extractions were made and each was acidulated, whereupon a precipitate formed in each.

The precipitates of each extraction portions were washed with water, and evaporated to dryness so as to dispel any ether therefrom. The yield of dried precipitate was two pounds and two ounces and was a thick dark viscous brownish-green solid material containing probably in excess of 60% nordihydroguaiaretic acid.

Example III

Two and one half pounds of *Larrea divaricata* plant material which had been ground to a mixed mesh of 20 to 80 was extracted in a Soxhlet-type extractor with 1 gallon of ethylene dichloride for 24 hours at about 50° C. The extract was then separated and evaporated nearly to dryness and the residue was dissolved in 1¼ liters of diethyl ether. After standing overnight a precipitate formed and this was filtered out.

The 1¼ liter batch was then extracted with 250 cc. of 5% sodium bicarbonate in 30 cc. portions, each being shaken and separated as in Example I. The thus semi-purified ether solution plant extract material was washed with 250 cc. of 5% sodium carbonate containing 1½% sodium hydrosulfite, using successive washings of 50 cc., each being shaken and separated. The purified ether solution of plant extract was fractionated as in Example I with fifteen 30 cc. portions of 5% sodium hydroxide containing 2½% sodium hydrosulfite, each portion being added, shaken for 1-2 minutes, separated and acidulated (acid to litmus) with hydrochloric acid. The separated 30 cc. portions were numbered sequentially.

Extractions 1-5 exhibited the orange flavone color reactions when tested with ferric chloride test solution in the presence of sodium carbonate test solution, using the technique described in Example I. Extraction 6 exhibited the color reactions characteristic of catechol (here indicative of the presence of nordihydroguaiaretic acid). Extractions Nos. 7, 8, 9 and 10 were reasonably clean extractions, yielded crystalline material upon standing and exhibited the color reaction of catechol (here nordihydroguaiaretic acid). Extractions Nos. 11-15 yielded some crystalline material upon standing, and exhibited to some extent the color reactions characteristic of catechol (here nordihydroguaiaretic acid) but contained a greenish pigment.

While the sodium salts, viz: sodium bicarbonate, sodium carbonate, sodium hydroxide and sodium hydrosulfite have been referred to for washing and extracting purposes, other alkaline materials such as the corresponding potassium lithium or ammonium bicarbonates, carbonates, hydroxide and hydrosulfites may be used. However, low cost and availability favors the use of the sodium salts.

Many obvious variations will occur to those skilled in the art and are considered within the purview of the invention illustrated, described and claimed.

I claim as my invention:

1. The process of making relatively pure extract of plants of the species *Larrea divaricata* which comprises extracting said plant with a water immiscible organic solvent which extracts material exhibiting the color reactions of catechol with ferric chloride in the presence of sodium carbonate, to produce a primary extract containing nordihydroguaiaretic acid, fat, waxes, rubber-like materials and pigments, evaporating at least part of said solvent to precipitate impurities, removing precipitated impurities and purifying said primary extract by successively reacting it with successively more alkaline reacting solution, and separating the successive reaction products.

2. The process of claim 1 further characterized in that said extract is successively reacted with sodium carbonate and with sodium hydroxide, said successive reactions being in the presence of sodium hydrosulfite.

3. The process of preparing an extract of plant material of the species *Larrea divaricata* which comprises contacting said plant material with an organic solvent which extracts material yielding the color reactions of catechol with ferric chloride in the presence of sodium carbonate, to produce a primary extract containing extracted materials containing nordihydroguaiaretic acid, fat, waxes, rubber-like materials and pigments, evaporating at least part of said solvent to precipitate impurities, removing precipitated impurities, treating the extracted materials while dissolved in a water immiscible solvent with an alkaline solution to dissolve extracted material, and recovering extracted material from the alkaline solution.

4. The process of claim 3 further characterized in that the extracted materials from the primary extract are treated with successive portions of the alkaline solution.

5. The process of claim 3 further characterized in that the extracted materials from the primary extract are treated with successive portions of alkaline solution of progressively increasing alkalinity.

6. The process of claim 3 further characterized in that a reducing agent is present in any strongly alkaline solution employed.

7. The process of claim 3 further characterized in that extracted material is recovered from the alkaline solution by acidulation.

8. The process of preparing an extract of plant material of the species *Larrea divaricata* which comprises contacting said plant material with an organic solvent which extracts material yielding the color reactions of catechol with ferric chloride in the presence of sodium carbonate, to produce a primary extract containing nordihydroguaiaretic acid, fat, waxes, rubber-like materials and pigments, mixing said extract with alkali metal carbonate in the presence of a reducing agent, evaporating the mixture to dryness and extracting the mixture with a water immiscible solvent for the plant extract, separating undissolved material, extracting the remaining solution with an aqueous alkaline solution, and recovering extracted material from the aqueous solution.

9. The process of preparing an extract of plant material of the species *Larrea divaricata* which comprises contacting said plant material with an organic solvent which extracts material yielding the color reactions of catechol with ferric chloride in the presence of sodium carbonate, to produce a primary extract containing nordihydroguaiaretic acid, fat, waxes, rubber-like materials and pigments, admixing said extract with sodium carbonate and sodium hydrosulfite, evaporating said solution to dryness, dissolving the dry residue in a water immiscible solvent to produce a second solution, separating any undissolved material and thereafter reacting successively said second solution with fractional stoichiometric proportions of aqueous sodium hydroxide solution containing a reducing agent, and separating each successive portion and recovering the plant extract fraction therein by acidulation.

10. The process of preparing an extract of plant material of the species *Larrea divaricata* which comprises contacting said plant material with an organic solvent which extracts material yielding the color reactions of catechol with ferric chloride in the presence of sodium carbonate, to produce a primary extract containing extracted materials including nordihydroguaiaretic acid, fat, waxes, rubber-like materials and pigments, evaporating at least part of the solvent to precipitate impurities, separating precipitated impurities, mixing the residue with a water-immiscible solvent, extracting the resultant solution with a plurality of portions of each of a plurality of alkaline solutions of progressively increasing alkalinity to dissolve extracted material, and recovering extracted material from the alkaline solution by acidulation.

11. The process of preparing an extract of plant material of the species *Larrea divaricata* which comprises contacting said plant material with a solvent which extracts material yielding color reactions of catechol with ferric chloride in the presence of sodium carbonate to produce a primary extract containing extracted materials including nordihydroguaiaretic acid, fat, waxes, rubber-like materials and pigments, evaporating at least part of said solvent to precipitate impurities, removing precipitated impurities, adding a water immiscible solvent, extracting the water immiscible solvent with an aqueous alkaline solution to dissolve extracted material and recovering extracted material from the alkaline solution.

12. The process of making a relatively pure extract of plants of the species *Larrea divaricata* which comprises extracting said plant with diethyl ether to produce a primary extract containing nordihydroguaiaretic acid, fat, waxes, rubber-like materials and pigments, evaporating part of the ether to form a precipitate of rubber-like complexes, separating the precipitated material and treating the primary extract with an alkaline solution to dissolve extracted material, and recovering the extracted material from the alkaline solution.

13. The process of making a relatively pure extract of plants of the species *Larrea divaricata* which comprises extracting the plant material with ethylene dichloride to produce a primary extract containing nordihydroguaiaretic acid, fat, waxes, rubber-like materials and pigments, evaporating most of the ethylene dichloride and dissolving the residue in diethyl ether, separating off the precipitate formed, and then contacting the remaining solution successively with alkaline solutions of progressively increasing alkalinity, and recovering the extracted material from the alkaline solution.

OLE GISVOLD.

REFERENCES CITED

The following references are of record in the file of this patent:

UNITED STATES PATENTS

| Number | Name | Date |
|---|---|---|
| 1,250,132 | Blundell | Dec. 18, 1917 |
| 2,096,922 | Sandowsky | Oct. 26, 1937 |
| 2,079,415 | Levinson | Mar. 4, 1937 |
| 1,595,604 | Heffner et al. | Aug. 10, 1926 |
| 1,986,320 | Burdick | Jan. 1, 1935 |

FOREIGN PATENTS

| Number | Country | Date |
|---|---|---|
| 153,026 | Austria | Apr. 11, 1938 |
| 1,568 | Great Britain | 1880 |

OTHER REFERENCES

Schroeter et al., Ber. Deut. Chem., vol. 51, p. 1608 (1918).